United States Patent
Obara et al.

(10) Patent No.: US 7,079,817 B2
(45) Date of Patent: Jul. 18, 2006

(54) RADIO COMMUNICATION DEVICE THAT MEETS A PLURALITY OF FREQUENCY BANDS

(75) Inventors: Toshio Obara, Kanagawa (JP); Takashi Miura, Kanagawa (JP); Hidenori Matsumoto, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/526,952

(22) PCT Filed: Jan. 30, 2004

(86) PCT No.: PCT/JP2004/000934

§ 371 (c)(1),
(2), (4) Date: Mar. 8, 2005

(87) PCT Pub. No.: WO2004/068733

PCT Pub. Date: Aug. 12, 2004

(65) Prior Publication Data

US 2006/0019612 A1    Jan. 26, 2006

(30) Foreign Application Priority Data

Jan. 30, 2003 (JP) ............................. 2003-022103

(51) Int. Cl.
*H04B 1/38* (2006.01)

(52) U.S. Cl. .................. 455/82; 455/78; 455/562.1

(58) Field of Classification Search ............ 455/426.2, 455/426.1, 500, 82, 83, 552.1, 553.1, 562.1, 455/575.7, 78, 132, 133, 269; 375/146, 147; 333/101, 126, 129

See application file for complete search history.

(56) References Cited

U.S. PATENT DOCUMENTS

| 5,915,212 A | * | 6/1999 | Przelomiec et al. ........... 455/83 |
| 6,658,263 B1 | * | 12/2003 | Ke et al. ..................... 455/524 |
| 2002/0039912 A1 | * | 4/2002 | Yamaguchi et al. ......... 455/561 |

FOREIGN PATENT DOCUMENTS

| JP | 05-26003 | 10/1993 |
| JP | 8-293846 | 11/1996 |
| JP | 2000-244360 | 9/2000 |
| JP | 2000-269848 | 9/2000 |
| JP | 2001-267952 | 9/2001 |
| JP | 2001-285114 | 10/2001 |

* cited by examiner

*Primary Examiner*—Eliseo Ramos-Feliciano
*Assistant Examiner*—Dai Phuong
(74) *Attorney, Agent, or Firm*—Pearne & Gordon LLP (57) ABSTRACT

It is an object of the present invention to switch bands with a simple structure in which frequency bands can be individually switched respectively in a transmission and a reception and only a receiving part can be switched to another frequency band without disconnecting an upward line during communication.

The device of the invention includes an antenna (1) capable of transmitting and receiving radio waves of first and second frequency bands, a wave separator (2), antenna sharing devices (3A, 3B) respectively provided so as to correspond to the frequency bands, transmitting circuits (4A, 4B), transmitting PLL synthesizers (5A, 5B), receiving circuits (6A, 6B) and receiving PLL synthesizers (7A, 7B). A control part 102 controls, through a common three-line serial bus, the transmitting PLL synthesizers (5A, 5B), the receiving PLL synthesizers (7A, 7B), a transmitting band switching signal generating circuit (8) and a receiving band switching signal generating circuit (9) to individually switch the frequency bands respectively in the transmission and the reception.

4 Claims, 4 Drawing Sheets

RADIO COMMUNICATION DEVICE THAT MEETS A PLURALITY OF FREQUENCY BANDS

TECHNICAL FIELD

The present invention relates to a radio communication device that can meet a simultaneous transmitting and receiving radio communication system representative of a CDMA (Code Division multiple Access) portable telephone system and can meet the transmission and reception of a plurality of frequency bands.

BACKGROUND ART

In the CDMA portable telephone system in, for instance, a UMTS (Universal Mobile Telecommunication System) or the like, a simultaneous transmission and reception can be carried out by using a plurality of different frequency bands and the frequency bands can be switched respectively for the transmission and the reception to perform a communication.

In a radio communication device used in such a radio communication system, a band switching signal common to a transmitting part and a receiving part is generated in a base band signal processing part or a control part. Th band switching signal has been ordinarily used to switch the frequency bands respectively for the transmitting part and the receiving part. Further, in a compressed mode upon switching the frequency bands, an exclusive switching signal and timing for switching the frequency bands have usually needed to be set and prepared.

As an example of the radio communication device capable of transmitting and receiving in a plurality of frequency bands, a device has been known which includes a voltage control oscillator that has a plurality of oscillating stages for oscillating one or more frequency bands and selectively switches and operates the oscillating stages and a local oscillator having a variable frequency divider with a variable frequency dividing ratio for dividing a part of the output of the voltage control oscillator to supply the frequency divided output to a phase comparator. The oscillating stages of the voltage control oscillator have been switched to oscillating stages respectively corresponding to a plurality of mobile telecommunication systems using different radio frequency bands to oscillate. According to this structure, local oscillating frequencies to the plurality of mobile telecommunication systems can be supplied by the local oscillator composed of one PLL frequency synthesizer (for instance, see Patent Document 1).

Further, to meet a multi-mode radio communication, there is a multi-mode radio communication converter including a transmit and receive mixer part having an antenna of a plurality of or multiple bands capable of being selected and an oscillator capable of being oscillated by a plurality of oscillating frequencies that can be selected to convert the frequency of a first input signal by using one oscillating frequency selected from the plurality of oscillating frequencies, a modulating/demodulating part for modulating/demodulating a second input signal so as to meet one communication system selected from a plurality of communication systems and a specific modulating/demodulating part for modulating/demodulating a third input signal so as to meet a specific radio communication system. Such a converter is employed so tat an existing communication terminal can be used in a different radio communication system as it is (for instance, see Patent Document 2).

(Patent Document 1) JP-A-2000-244360

(Patent Document 2) JP-A-2000-269848

However, in the above-described usual radio communication device, the common frequency band switching signal is supplied to the transmitting part and the receiving part to switch the frequency band. Accordingly, for instance, when only the receiving part is switched to another frequency band, the state of a communication line (a downward line) from a base station to the radio communication device is hardly monitored without disconnecting a communication line (an upward line) from the radio communication device to the base station, or an actual communication hardly performed.

Further, in a usual frequency band switching method, the frequency band switching signal is generated in the base band signal processing part or the control part. Thus, when independent band switching signals are desired to be obtained respectively in the transmitting part and the receiving part, hardware needs to be added to the base band signal processing part or the control part. Therefore, a circuit scale is increased and the number of interface signal lines is increased so that the structure of the device is undesirably enlarged and complicated.

Further, in a system having a time offset in the boundary of time slots of the transmission and the reception of the simultaneous transmitting and receiving system, an individual antenna is prepared for each frequency band. In this case, even when separate band switching signals are prepared separately for transmitting and receiving, it is not suitable to commonly use the band switching signals as antenna switching signals upon compressed mode operation. Therefore, exclusive band switching signals for switching the antennas are separately required.

The present invention is proposed to solve the above-described problems and it is an object of the present invention to provide a radio communication device in which frequency bands can be individually switched respectively in a transmission and a reception with a simple structure without making the structure of the device enlarged or complicated, only a receiving part can be switched to another frequency band without disconnecting an upward line during a communication or the state of a downward line in another frequency band can be monitored or a communication can be performed.

DISCLOSURE OF THE INVENTION

A radio communication device according to a first structure of the present invention comprises: an antenna common for transmitting and receiving for meeting a first frequency band and a second frequency band; a first transmitting unit for transmitting so as to meet the first frequency band; a first receiving unit for receiving so as to meet the first frequency band; a first antenna sharing device for connecting an output part of the first transmitting unit to an input part of the first receiving part; a second transmitting unit for transmitting so as to meet a second frequency band; a second receiving unit for receiving so as to meet the second frequency band; a second antenna sharing device for connecting an output part of the second transmitting unit to an input part of the second receiving unit; a wave separator for connecting the antenna to the first antenna sharing device and the second antenna sharing device; a transmitting band switching signal generating unit for operating either of the first transmitting unit and the second transmitting unit to generate a transmitting band switching signal for switching a transmitting frequency band; a receiving band switching signal generating unit for operating either of the first receiving unit and the second receiving unit to generate a receiving band switching signal for switching a receiving frequency band; and a control unit for controlling the operations of the first and second transmitting units, the first and second receiving units, the transmitting band switching signal generating unit and the receiving band switching signal generating unit.

According to the above-described structure, the transmitting band switching signal and the receiving band switching signal are respectively formed for transmitting and receiving. The operations of the transmitting units and the receiving units respectively corresponding to the first and second frequency bands are switched so that the frequency bands can be individually switched respectively for transmitting and receiving. Thus, only a receiving side can be switched to another frequency band without disconnecting an upward line in a transmitting side during a communication, the state of a downward line in a receiving side in other frequency band can be monitored or a communication can be performed.

A radio communication device according to a second structure of the present invention comprises: a first antenna common for transmitting and receiving for meeting a first frequency band; a first transmitting unit for transmitting so as to meet the first frequency band; a first receiving unit for receiving so as to meet the first frequency band; a first antenna sharing device for connecting an output part of the first transmitting unit to an input part of the first receiving part; a second antenna common for transmitting and receiving for meeting a second frequency band; a second transmitting unit for transmitting so as to meet the second frequency band; a second receiving unit for receiving so as to meet the second frequency band; a second antenna sharing device for connecting an output part of the second transmitting unit to an input part of the second receiving unit; a wave separator for connecting the first antenna or the second antenna to the first antenna sharing device and the second antenna sharing device; an antenna switching unit for switching the connection of the wave separator to the first and second antennas; a transmitting band switching signal generating unit for operating either of the first transmitting unit and the second transmitting unit to generate a transmitting band switching signal for switching a transmitting frequency band; a receiving band switching signal generating unit for operating either of the first receiving unit and the second receiving unit to generate a receiving band switching signal for switching a receiving frequency band; an antenna switching signal generating unit for delaying the receiving band switching signal by a prescribed amount to generate an antenna switching signal for controlling the antenna switching unit; and a control unit for controlling the operations of the first and second transmitting units, the first and second receiving units, the transmitting band switching signal generating unit and the receiving band switching signal generating unit.

According to the above-described structure, the transmitting band switching signal and the receiving band switching signal are respectively formed for transmitting and receiving. The operations of the transmitting units and the receiving units respectively corresponding to the first and second frequency bands are switched so that the frequency bands can be individually switched respectively for transmitting and receiving. Further, the first antenna or the second antenna is switched by the antenna switching signal generated by delaying the receiving band switching signal so that the timings of transmitting and receiving can correspond to the switching timings of the frequency bands. Thus, in a system that a time offset is present in the boundary of time slots of a transmission and a reception in a simultaneous transmitting and receiving system, when individual antennas are used respectively for frequency bands, an inconvenience such as the loss of data can be prevented and an antenna switching operation with a high quality can be realized.

A radio communication device according to a third structure of the present invention comprises: a first antenna common for transmitting and receiving for meeting a first frequency band; a first transmitting unit for transmitting so as to meet the first frequency band; a first receiving unit for receiving so as to meet the first frequency band; a first antenna sharing device for connecting an output part of the first transmitting unit to an input part of the first receiving part; a second antenna common for transmitting and receiving for meeting a second frequency band; a second transmitting unit for transmitting so as to meet the second frequency band; a second receiving unit for receiving so as to meet the second frequency band; a second antenna sharing device for connecting an output part of the second transmitting unit to an input part of the second receiving unit; an external connector part for connecting an external antenna; an antenna switching unit for switching the connection of the first antenna, the second antenna and the external connector part to the first and second antenna sharing devices; a transmitting band switching signal generating unit for operating either of the first transmitting unit and the second transmitting unit to generate a transmitting band switching signal for switching a transmitting frequency band; a receiving band switching signal generating unit for operating either of the first receiving unit and the second receiving unit to generate a receiving band switching signal for switching a receiving frequency band; an antenna switching signal generating unit for delaying the receiving band switching signal by a prescribed amount to generate an antenna switching signal for controlling the antenna switching unit; and a control unit for controlling the operations of the first and second transmitting units, the first and second receiving units, the transmitting band switching signal generating unit, the receiving band switching signal generating unit and the antenna switching unit.

According to the above-described structure, a switching operation for selecting any of the first or second antenna and the external antenna and a switching operation for selecting either the first antenna or the second antenna can be carried out in accordance with the frequency bands by using the antenna switching signal generated by delaying the receiving band switching signal and a switching signal for switching an inner antenna/an external antenna. Thus, the switching operation of a transmitting part and a receiving part corresponding to the plurality of first and second frequency bands, the switching operation of the first and second antennas and the switching operation of the first and second antennas and the external antenna can be realized with a very simple structure.

Further, the first and second transmitting units, the first and second receiving units, the transmitting band switching signal generating unit and the receiving band switching signal generating unit are connected to the control unit by a common three-line serial bus.

According to the above-described structure, the frequency bands can be independently switched respectively in the transmission and the reception without enlarging a circuit scale such as the addition of hardware in a control part, the increase of interface signal lines between the control part and a radio part or the like.

In the drawings, reference numerals 1, 1A and 1B designate antennas, 2 designates a wave separator, 3A and 3B designate antenna sharing devices, 4A and 4B designate transmitting circuits, 5A and 5B designate transmitting PLL synthesizers, 6A and 6B designate receiving circuits, 7A and 7B designate receiving PLL synthesizers, 8 designates a transmitting band switching signal generating circuit, 9 designates a receiving band switching signal generating circuit, 10 and 13 designate antenna switching circuits, 11 designates a delay circuit, 12 designates an external connector, 101, 201 and 301 designate radio parts and 102 designates a control part.

BEST MODE FOR CARRYING OUT THE INVENTION

Now, embodiments of the present invention will be described by referring to the drawings. A radio communication device according to this embodiment may be applied to, for instance, a mobile station device such as a portable telephone terminal in a mobile telecommunication system.

FIRST EMBODIMENT

Figure 1:
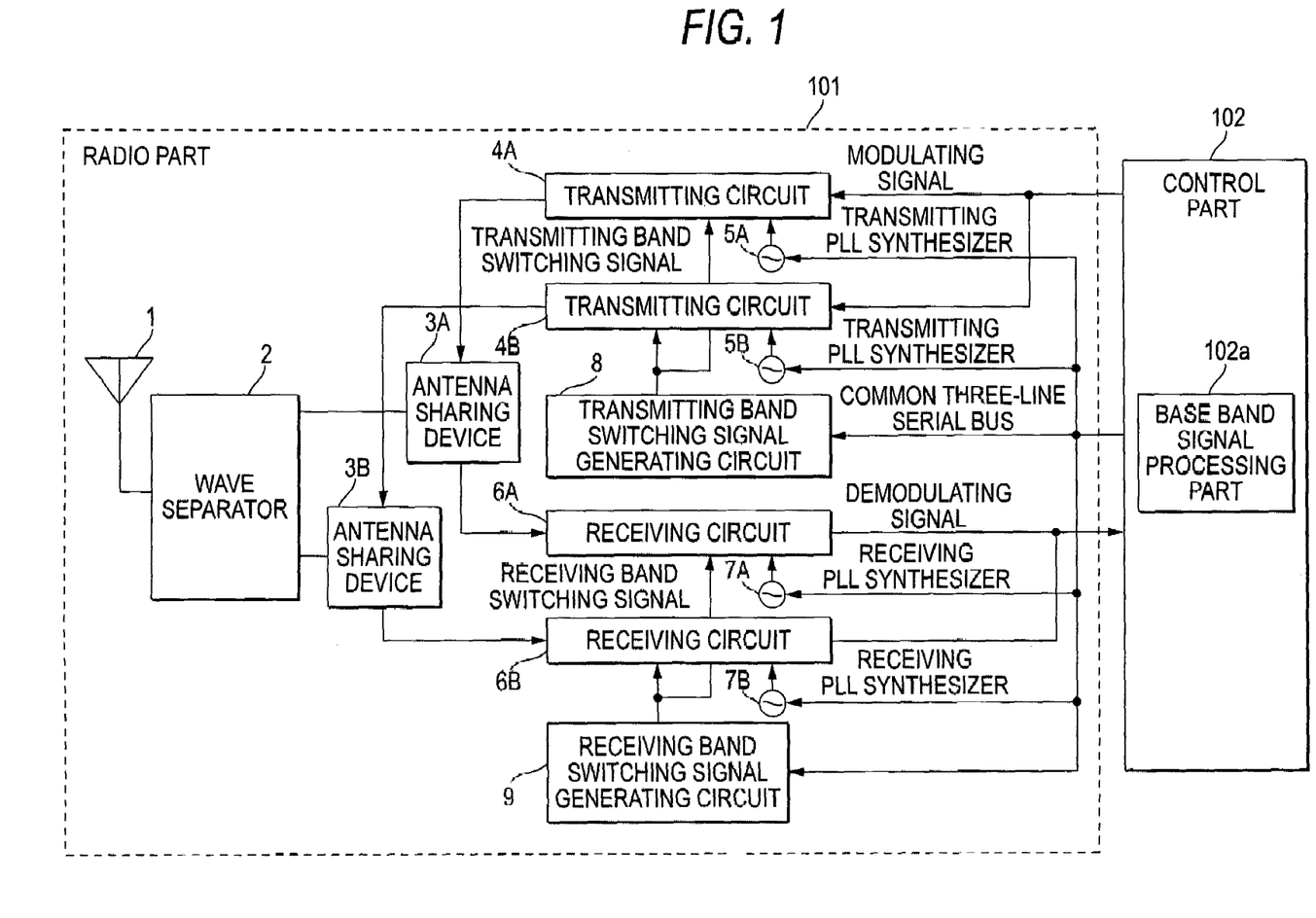
FIG. 1 is a block diagram showing the structure of a radio communication device according to a first embodiment of the present invention.

FIG. 1 is a block diagram showing a structure of a radio communication device according to a first embodiment of the present invention.

The radio communication device of the first embodiment includes, as a radio part 101, an antenna 1 capable of transmitting and receiving radio waves of first and second different frequency bands, a wave separator 2, antenna sharing devices 3A and 3B, transmitting circuits 4A and 4B, transmitting PLL synthesizers 5A and 5B, receiving circuits 6A and 6B, receiving PLL synthesizers 7A and 7B, a transmitting band switching signal generating circuit 8, a receiving band switching signal generating circuit 9 and a control part 102 having a base band signal processing part 102a.

The first transmitting circuit 4A is connected to one terminal of the first antenna sharing device 3A. The first receiving circuit 6A is connected to the other terminal. The second transmitting circuit 4B is connected to one terminal of the second antenna sharing device 3B and the second receiving circuit 6B is connected to the other terminal. Further, the common terminals of the antenna sharing devices 3A and 3B are respectively connected to both the terminals of the wave separator 2. The antenna 1 is connected to one terminal of the wave separator 2.

Further, the transmitting PLL synthesizers 5A and 5B, the transmitting band switching signal generating circuit 8, the receiving PLL synthesizers 7A and 7B and the receiving band switching signal generating circuit 9 are respectively connected to the control part 102 by a common three-line serial bus.

In the above description, an affixed character A attached to a reference numeral in each block shows a component corresponding to a first frequency band and an affixed character B shows a component corresponding to a second frequency band.

Now, an operation of the radio communication device of the first embodiment constructed as described above will be described. Here, a case in which a transmitting operation is carried out by using the first frequency band and a receiving operation is carried out by using the second frequency band will be described as an example.

Firstly, the transmitting operation will be described. The control part 102 controls the transmitting band switching signal generating circuit 8 and the transmitting PLL synthesizer 5A through the three-line serial bus to operate. Thus, the transmitting band switching signal generating circuit 8 generates a transmitting band switching signal to select and operate the transmitting circuit 4A. The transmitting PLL synthesizer 5A generates a local oscillating signal and supplies the local oscillating signal to the transmitting circuit 4A.

Then, the control part 102 processes transmit data to generate a transmitting base band signal and output the transmitting base band signal to the transmitting circuit 4A. The transmitting circuit 4A modulates and amplifies the transmitting base band signal. The transmitting circuit 4A up-converts the modulated and amplified transmitting base band signal by a radio frequency of the first frequency band based on the local oscillating signal supplied from the transmitting PLL synthesizer 5A to generate a transmitting high frequency signal and amplifies the transmitting high frequency signal by electric power and outputs the power amplified transmitting high frequency signal to the antenna sharing device 3A. The power amplified transmitting high frequency signal is supplied to the wave separator 2 through the antenna sharing device 3A. After a frequency band of the power amplified transmitting high frequency signal is limited to be adapted to the first frequency band by the wave separator 2, the power amplified transmitting high frequency signal is supplied to the antenna 1 and emitted to space.

Then, the receiving operation is described below. The control part 102 controls the receiving band switching signal generating circuit 9 and the receiving PLL synthesizer 7B through the three-line serial bus to operate. Thus, the receiving band switching signal generating circuit 9 generates a receiving band switching signal to select and operate the receiving circuit 6B. The receiving PLL synthesizer 7B generates a local oscillating signal to supply the local oscillating signal to the receiving circuit 6B.

The received radio wave of the second frequency band received simultaneously with the transmitting operation or individually received by the antenna 1 has a band limited to be adapted to the second frequency band by the wave separator 2 and is supplied to the antenna sharing device 3B. The antenna sharing device 3B separates the received radio wave as a receiving high frequency signal and outputs the receiving high frequency signal to the receiving circuit 6B.

The receiving circuit 6B amplifies the receiving high frequency signal, then down-converts the amplified receiving high frequency signal from a radio frequency of the second frequency band on the basis of a local oscillating signal supplied form the receiving PLL synthesizer 7B to be demodulated and obtain a receiving base band signal. The receiving base band signal is outputted to the control part 102 to process data.

As described above, in the radio communication device of the first embodiment, the two systems of the antenna sharing devices, the transmitting circuits, the receiving circuits, the transmitting PLL synthesizers and the receiving PLL synthesizers are individually provided to meet the plurality of frequency bands. The transmitting band switching signal generating circuit and the receiving band switching signal generating circuit are controlled by the control part so that the frequency bands for transmitting and receiving can be individually switched and operated by the individual band switching signals for transmitting and receiving.

Accordingly, only a receiving part can be switched to another frequency band without disconnecting an upward line for transmitting data from the radio communication device to a base station during a communication, the state of a downward line in other frequency band can be monitored or a communication in other frequency band can be carried out.

Further, the control part 102 is connected to the transmitting PLL synthesizers 5A and 5B, the receiving PLL synthesizers 7A and 7B, the transmitting band switching signal generating circuit 8 and the receiving band switching signal generating circuit 9 by the common three-line serial bus and controls them through the common three-line serial bus. Thus, the frequency bands can be switched without increasing interface signal lines between the radio part 101 and the control part and adding hardware to the control part 102. Therefore, the increase of a circuit scale can be suppressed to a minimum.

In this embodiment, an example that the data is transmitted by using the first frequency band and the data is received by using the second frequency band is described. However, it is to be understood that the data may be transmitted conversely by using the second frequency band and the data may be received by using the first frequency band to obtain the same effects.

SECOND EMBODIMENT

Figure 2:
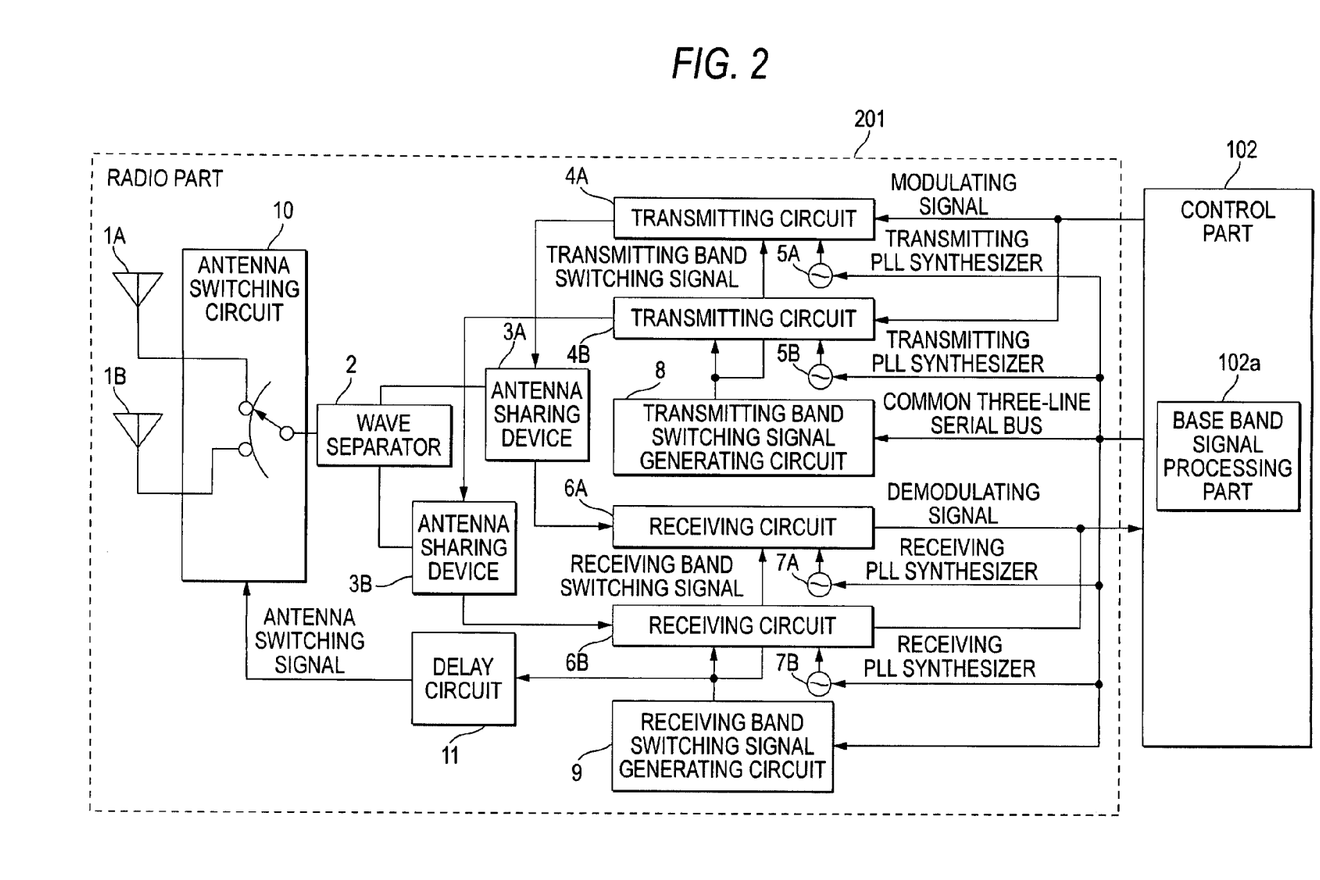
FIG. 2 is a block diagram showing the structure of a radio communication device according to a second embodiment of the present invention.

FIG. 2 is a block diagram showing the structure of a radio communication device according to a second embodiment of the present invention.

The radio communication device according to the second embodiment, includes in a radio part 201, a first antenna 1A capable of transmitting and receiving a radio wave of a first frequency band, a second antenna 1B capable of transmitting and receiving a radio wave of a second frequency band, an antenna switching circuit 10 for switching the connection of a wave separator 2 and the antenna 1A or 1B by an antenna switching signal and a delay circuit 11 for delaying a receiving band switching signal generated by a receiving band switching signal generating circuit 9 to output the receiving band switching signal as the antenna switching signal. The antenna switching circuit 10 is composed of an SPDT (Single Pole Dual Through) switch and selectively connects the antenna 1A or 1B to the wave separator 2 to switch the antennas. Other structures are the same as those of the first embodiment and components the same as those of the first embodiment shown in FIG. 1 are designated by the same reference numerals and the explanation thereof is omitted.

Now, an operation of the radio communication device of the second embodiment constructed as described above will be described. Here, a case that a transmitting operation is carried out by using a first frequency band and a receiving operation is carried out by using a second frequency band is described as an example like the first embodiment.

A control part 102 operates a transmitting band switching signal generating circuit 8 and a transmitting PLL synthesizer 5A for performing the transmitting operation to generate a transmitting band switching signal in the transmitting band switching signal generating circuit 8 and generate a local oscillating signal in the transmitting PLL synthesizer 5A and supply the signals to a transmitting circuit 4A.

Then, the control part 102 processes transmit data to generate a transmitting base band signal and outputs the transmitting base band signal to the transmitting circuit 4A. The transmitting circuit 4A modulates and amplifies the transmitting base band signal. The transmitting circuit 4A up-converts the modulated and amplified transmitting base band signal by a radio frequency of the first frequency band based on the local oscillating signal supplied from the transmitting PLL synthesizer 5A to generate a transmitting high frequency signal and amplifies the transmitting high frequency signal by electric power and outputs the power amplified transmitting high frequency signal to an antenna sharing device 3A. The power amplified transmitting high frequency signal is supplied to the wave separator 2 through the antenna sharing device 3A. After a frequency band of the power amplified transmitting high frequency signal is limited to be adapted to the first frequency band by the wave separator 2, the power amplified transmitting high frequency signal is supplied to the antenna 1A switched by the antenna switching circuit 10 and emitted to space from the antenna 1A.

Further, the control part 102 controls the receiving band switching signal generating circuit 9 and a receiving PLL synthesizer 7B for performing a receiving operation to generate the receiving band switching signal in the receiving band switching signal generating circuit 9 and generate a local oscillating signal by the receiving PLL synthesizer 7B and supply the signals to a receiving circuit 6B. At this time, the receiving band switching signal outputted from the receiving band switching signal generating circuit 9 is delayed in the delay circuit 11 and the delayed receiving band switching signal is supplied to the antenna switching circuit 10 as the antenna switching signal.

In the antenna 1B switched by the antenna switching circuit 10, a radio wave is received simultaneously with the transmitting operation by the antenna 1A or individually received and inputted to the wave separator 2. Then, the received radio wave has a band limited to be adapted to the second frequency and is separated as a receiving high frequency signal by an antenna sharing device 3B and the receiving high frequency signal is outputted to the receiving circuit 6B. The receiving circuit 6B amplifies the receiving high frequency signal, then down-converts the amplified receiving high frequency signal from a radio frequency of the second frequency band on the basis of the local oscillating signal supplied form the receiving PLL synthesizer 7B to be demodulated and obtain a receiving base band signal. The receiving base band signal is inputted to the control part 102 to process data in the control part and generate receive data.

As described above, in the radio communication device of the second embodiment, the two systems of the antenna sharing devices, the transmitting circuits, the receiving circuits, the transmitting PLL synthesizers and the receiving PLL synthesizers are individually provided to meet the plurality of frequency bands. Further, the two systems of the antennas common for transmitting and receiving operations are also provided respectively for the frequency bands. The SPDT type switch is used to switch the antennas, so that the frequency bands for transmitting and receiving operations can be individually switched and operated by individual band switching signals for transmitting and receiving operations.

Further, the antenna switching circuit 10 is controlled by using the antenna switching signal generated by delaying the receiving band switching signal by the delay circuit 11 to switch the antennas 1A and 1B. Accordingly, in a simultaneous transmitting and receiving system having a time offset in the boundary of time slots of a transmission and a reception, the loss of transmit data can be prevented. Thus, the switching operation of the antennas including a compressed mode in a CDMA portable telephone system of high quality can be realized.

Figure 3:
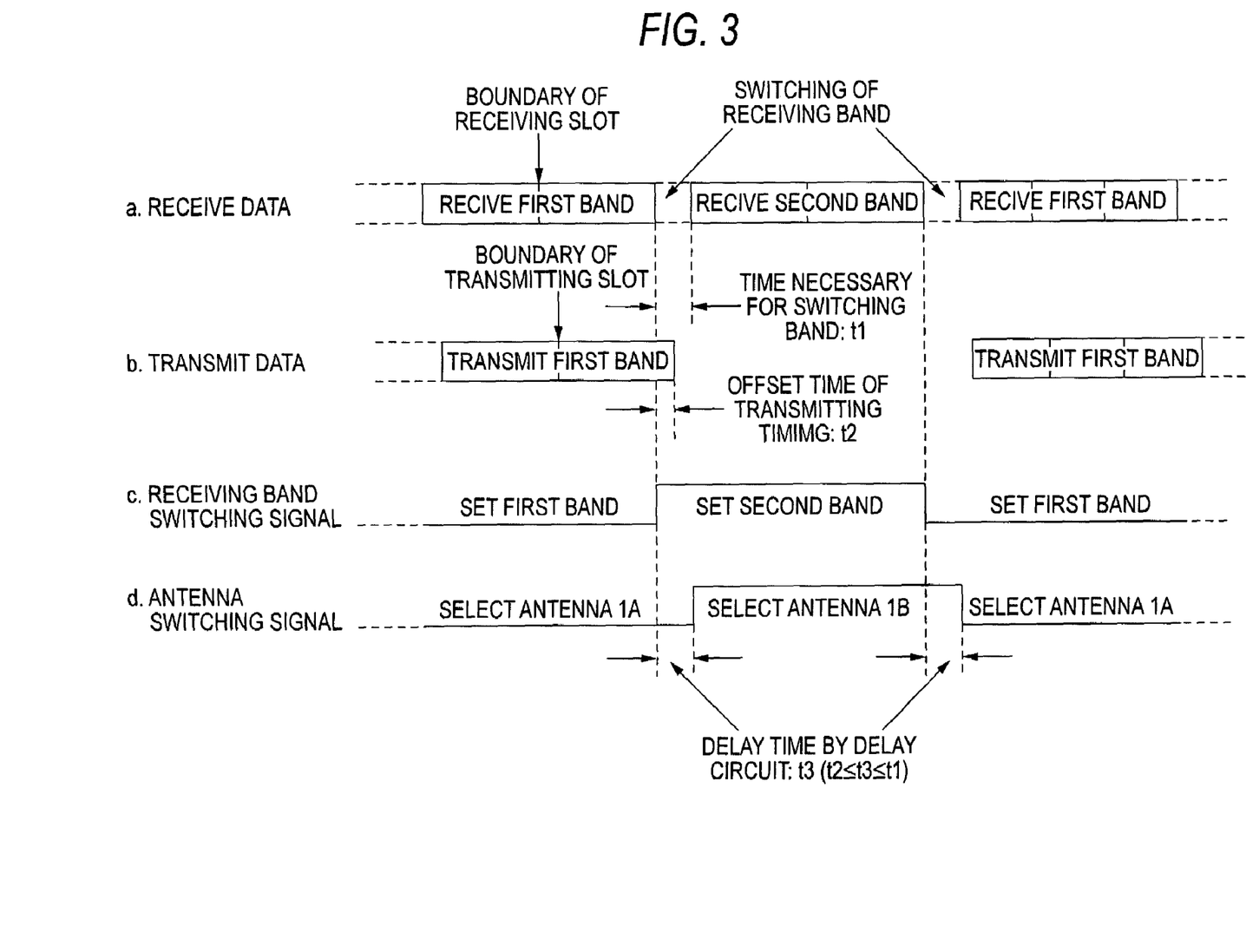
FIG. 3 is a timing chart showing a switching operation of frequency bands and antennas in a compressed mode.

FIG. 3 is an operation timing chart for explaining the function of the delay circuit 11 in the compressed mode. As shown in FIG. 3, there is an offset time t2 of transmitting and receiving timings between a receiving slot and a transmitting slot. Thus, when the second frequency band is temporarily received during a communication in the first frequency band, if the receiving band switching signal is not delayed and directly used as the antenna switching signal, the transmit data corresponding to the time t2 is missed. However, in this embodiment, the receiving band switching signal is delayed by time t3 by the delay circuit 11 and the delayed receiving band switching signal is used as the antenna switching signal so that the loss of the transmit data can be prevented.

THIRD EMBODIMENT

Figure 4:
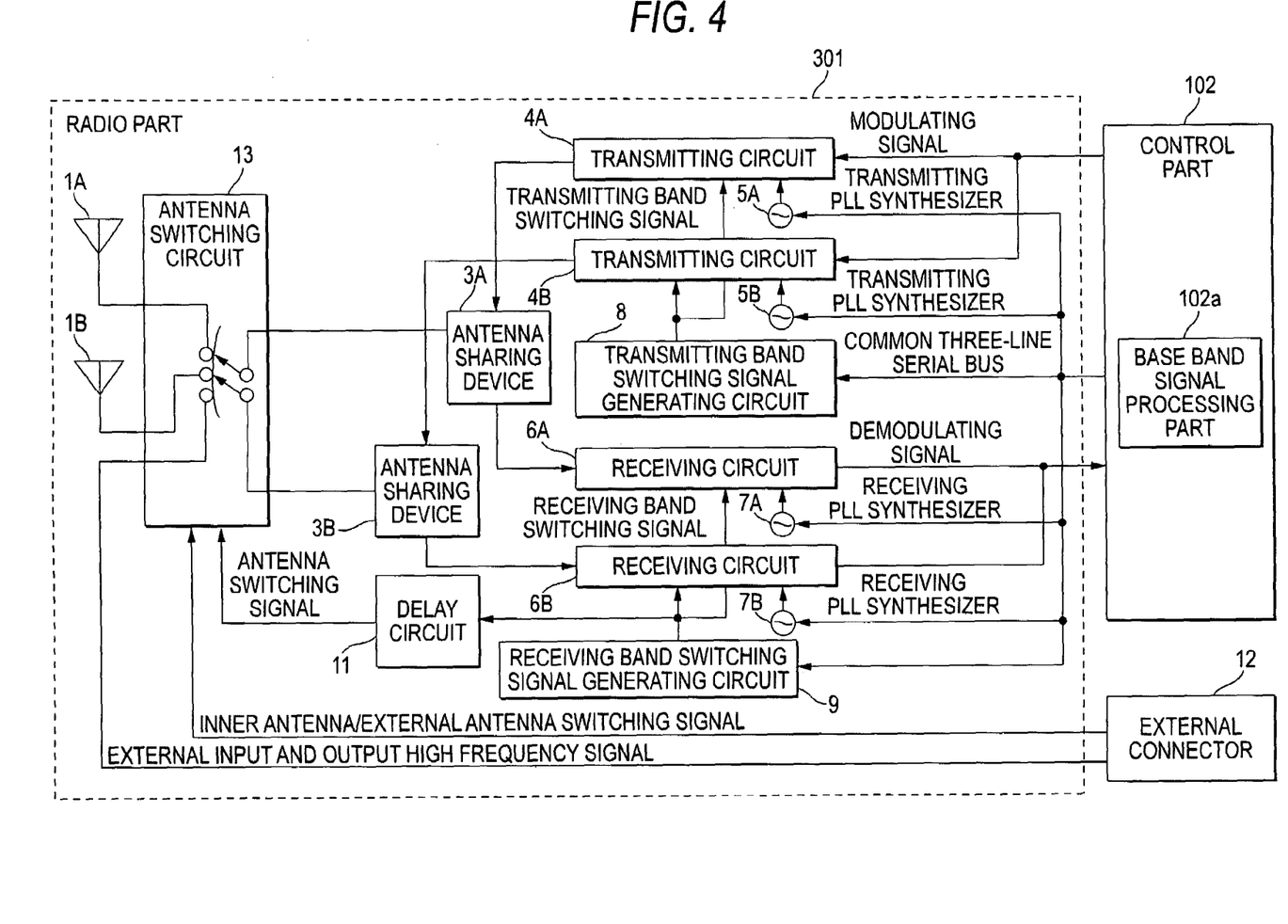
FIG. 4 is a block diagram showing the structure of a radio communication device according to a third embodiment of the present invention.

FIG. 4 is a block diagram showing the structure of a radio communication device according to a third embodiment of the present invention.

The radio communication device according to the third embodiment includes, in a radio part 301, a first antenna 1A capable of transmitting and receiving a radio wave of a first frequency band, a second antenna 1B capable of transmitting and receiving a radio wave of a second frequency band, a delay circuit 11 for delaying a receiving band switching signal generated in a receiving band switching signal generating circuit 9 and outputting the delayed receiving band switching signal as an antenna switching signal, an external connector 12 for connecting an external antenna and an antenna switching circuit 13 for switching the connection of the antennas 1A and 1B and an external antenna. Other structures are the same as those of the first embodiment. Components the same as those of the first embodiment shown in FIG. 1 are designated by the same reference numerals and an explanation thereof is omitted.

The antenna switching circuit 13 is composed of a DP3T (Dual Pole 3 Through) switch and can arbitrarily select an antenna connected to antenna sharing devices 3A and 3B from the antennas 1A and 1B and the external antenna connected to the external connector 12. Any of the antennas 1A, 1B and the external antenna is selected and switched by using the antenna switching signal outputted from the delay circuit 11 and an inner antenna/external antenna switching signal supplied from the external connector 12.

Now, an operation of the radio communication device of the third embodiment constructed as described above will be described. Here, a case that a transmitting operation is carried out by using a first frequency band and a receiving operation is carried out by using a second frequency band is described as an example like the first embodiment.

A control part 102 operates a transmitting band switching signal generating circuit 8 and a transmitting PLL synthesizer 5A for performing the transmitting operation to generate a transmitting band switching signal in the transmitting band switching signal generating circuit 8 and generate a local oscillating signal in the transmitting PLL synthesizer 5A and supply the signals to a transmitting circuit 4A.

Then, the control part 102 processes transmit data to generate a transmitting base band signal and outputs the transmitting base band signal to the transmitting circuit 4A. The transmitting circuit 4A modulates and amplifies the transmitting base band signal. The transmitting circuit 4A up-converts the modulated and amplified transmitting base band signal by a radio frequency of the first frequency band based on the local oscillating signal supplied from the transmitting PLL synthesizer 5A to generate a transmitting high frequency signal and amplifies the transmitting high frequency signal by electric power and outputs the power amplified transmitting high frequency signal to an antenna sharing device 3A. The power amplified transmitting high frequency signal is supplied to the antenna switching circuit 13 from the antenna sharing device 3A, supplied to the antenna 1A or the external antenna switched by the antenna switching circuit 13 and emitted to space from the antenna 1A or the external antenna.

Further, the control part 102 controls the receiving band switching signal generating circuit 9 and a receiving PLL synthesizer 7B for performing a receiving operation to generate the receiving band switching signal in the receiving band switching signal generating circuit 9 and generate a local oscillating signal by the receiving PLL synthesizer 7B and supply the signals to a receiving circuit 6B. At this time, the receiving band switching signal outputted from the receiving band switching signal generating circuit 9 is delayed in the delay circuit 11 and the delayed receiving band switching signal is supplied to the antenna switching circuit 13 as the antenna switching signal.

In the antenna 1B or the external antenna switched by the antenna switching circuit 13, a radio wave is received simultaneously with the transmitting operation by the antenna 1A or the external antenna or individually received and inputted to an antenna sharing device 3B. Then, the received radio wave is separated as a receiving high frequency signal by the antenna sharing device 3B and the receiving high frequency signal is outputted to the receiving circuit 6B. The receiving circuit 6B amplifies the receiving high frequency signal and then down-converts the amplified receiving high frequency signal from a radio frequency of the second frequency band on the basis of the local oscillating signal supplied form the receiving PLL synthesizer 7B to be demodulated and obtain a receiving base band signal. The receiving base band signal is inputted to the control part 102 to process data in the control part and generate receive data.

As described above, in the radio communication device of the third embodiment, the external antenna is formed so as to be connected in addition to the second embodiment. The DP3T type switch is used to switch the antennas. Thus, whether the antenna 1A or 1B commonly used for transmitting and receiving is selected or the external antenna is selected can be switched and whether the antenna 1A is selected or 1B is selected can be switched by using the antenna switching signal generated by delaying the receiving band switching signal and the inner antenna/external antenna switching signal from the external connector 12. In this case, the transmitting circuits and the receiving circuits corresponding to the first and second frequency bands can be switched, the inner antenna can be switched and the inner/external antennas can be switched with a very simple structure.

According to the above-described embodiments, in the radio communication device that meets a plurality of frequency bands, the frequency bands can be individually switched respectively in the transmitting system and the receiving system to perform a communication. Only the receiving part can be switched to another frequency band without disconnecting the upward line during a communication or the state of the downward line in other frequency band can be monitored or a communication can be performed.

Further, the frequency bands are switched and controlled through the common three-line serial bus. Thus, while the increase of the circuit scale is suppressed to a minimum without adding hardware in the control part or adding a structure such as increasing the interface signal lines between the control part and the radio part, the frequency bands can be independently switched respectively for the transmitting system and the receiving system.

Further, a signal obtained by delaying the receiving band switching signal by a prescribed amount is used as the antenna switching signal. Accordingly, in the simultaneous transmitting and receiving system having the time offset in the boundary of the time slots of a transmission and a reception, the individual antenna is used for each of the frequency bands so that the loss of the transmit data generated when the frequency bands are switched can be prevented. Therefore, the antenna switching operation of high quality including the compressed mode of the CDMA system can be realized.

Further, as the antenna switching unit, the SPDT switch or the DP3T switch is used. Accordingly, the switching operation of the antennas can be easily controlled and realized with a small loss. Therefore, the compact radio communication device can be realized at a low cost with a low consumed power.

The present invention is not limited to the above-described embodiments and may be put to practice in various forms within a range without departing the gist thereof. For instance, in a radio communication device that meets a plurality of frequency bands having three or more frequency bands, the present invention may be applied to a case in which the two frequency bands thereof are switched individually for a transmitting operation and a receiving operation.

The present invention is specifically described above by referring to the specific embodiments. However, it is to be understood by a person with ordinary skill in the art that various changes or modifications may be made without departing the spirit and scope of the present invention.

This application is based on Japanese Patent Application No. 2003-022103 filed in Jan. 30, 2003. The contents thereof are taken in the present invention as a reference

INDUSTRIAL APPLICABILITY

As described above, according to the present invention, the radio communication device can be provided in which the frequency bands can be individually switched respectively in the transmitting operation and the receiving operation, only the receiving part can be switched to another frequency band without disconnecting the upward line during the communication, the state of the downward line in other frequency band can be monitored or the communication can be performed with a simple structure without enlarging the structure of the device or making the structure complicated.

The invention claimed is:

1. A radio communication device comprising:
an antenna common for transmitting and receiving for meeting a first frequency band and a second frequency band;
a first transmitting unit for transmitting so as to meet the first frequency band;
a first receiving unit for receiving so as to meet the first frequency band;
a first antenna sharing device for connecting an output part of the first transmitting unit to an input part of the first receiving unit;
a second transmitting unit for transmitting so as to meet the second frequency band;
a second receiving unit for receiving so as to meet the second frequency band;
a second antenna sharing device for connecting an output part of the second transmitting unit to an input part of the second receiving unit;
a wave separator for connecting the antenna to the first antenna sharing device and the second antenna sharing device, wherein the wave separator is adapted to perform a filtering operation;
a transmitting band switching signal generating unit for operating either of the first transmitting unit and the second transmitting unit to generate a transmitting band switching signal for switching a transmitting frequency band;
a receiving band switching signal generating unit for operating either of the first receiving unit and the second receiving unit to generate a receiving band switching signal for switching a receiving frequency band; and
a control unit for controlling the operations of the first and second transmitting units, the first and second receiving units, the transmitting band switching signal generating unit and the receiving band switching signal, generating unit.

2. A radio communication device comprising:
a first antenna common for transmitting and receiving for meeting a first frequency band;
a first transmitting unit for transmitting so as to meet the first frequency band;
a first receiving unit for receiving so as to meet the first frequency band;
a first antenna sharing device for connecting an output part of the first transmitting unit to an input part of the first receiving unit;
a second antenna common for transmitting and receiving for meeting a second frequency band;
a second transmitting unit for transmitting so as to meet the second frequency band;
a second receiving unit for receiving so as to meet the second frequency band;
a second antenna sharing device for connecting an output part of the second transmitting unit to an input part of the second receiving unit;
a wave separator for connecting the first antenna or the second antenna to the first antenna sharing device and the second antenna sharing device;
an antenna switching unit for switching the connection of the wave separator to the first and second antennas;
a transmitting band switching signal generating unit for operating either of the first transmitting unit and the second transmitting unit to generate a transmitting band switching signal for switching a transmitting frequency band;

a receiving band switching signal generating unit for operating either of the first receiving unit and the second receiving unit to generate a receiving band switching signal for switching a receiving frequency band;

an antenna switching signal generating unit for delaying the receiving band switching signal by a prescribed amount to generate an antenna switching signal for controlling the antenna switching unit; and a control unit for controlling the operations of the first and second transmitting units, the first and second receiving units, the transmitting band switching signal generating unit and the receiving band switching signal generating unit.

3. A radio communication device comprising:

a first antenna common for transmitting and receiving for meeting a first frequency band;

a first transmitting unit for transmitting so as to meet the first frequency band;

a first receiving unit for receiving so as to meet the first frequency band;

a first antenna sharing device for connecting an output part of the first transmitting unit to an input part of the first receiving unit;

a second antenna common for transmitting and receiving for meeting a second frequency band;

a second transmitting unit for transmitting so as to meet the second frequency band;

a second receiving unit for receiving so as to meet the second frequency band;

a second antenna sharing device for connecting an output part of the second transmitting unit to an input part of the second receiving unit;

an external connector part for connecting an external antenna;

an antenna switching unit for switching the connection of the first antenna, the second antenna and the external connector part to the first and second antenna sharing devices;

a transmitting band switching signal generating unit for operating either of the first transmitting unit and the second transmitting unit to generate a transmitting band switching signal for switching a transmitting frequency band;

a receiving band switching signal generating unit for operating either of the first receiving unit and the second receiving unit to generate a receiving band switching signal for switching a receiving frequency band;

an antenna switching signal generating unit for delaying the receiving band switching signal by a prescribed amount to generate an antenna switching signal for controlling the antenna switching unit; and a control unit for controlling the operations of the first and second transmitting units, the first and second receiving units, the transmitting band switching signal generating unit, the receiving band switching signal generating unit and the antenna switching unit.

4. A radio communication device according to any one of claims 1 to 3, characterized in that the first and second transmitting units, the first and second receiving units, the transmitting band switching signal generating unit and the receiving band switching signal generating unit are connected to the control unit by a common three-line serial bus.

* * * * *